United States Patent [19]

Musser et al.

[11] Patent Number: 4,865,377

[45] Date of Patent: Sep. 12, 1989

[54] SEAT RISER

[75] Inventors: James G. Musser, Birmingham; J. Ted Beebe, St. Clair Shores, both of Mich.

[73] Assignee: Knusaga Corporation, Troy, Mich.

[21] Appl. No.: 140,218

[22] Filed: Dec. 31, 1987

[51] Int. Cl.⁴ .............................................. B60N 1/02
[52] U.S. Cl. .................. 296/65.1; 296/68.1; 297/331; 248/503.1
[58] Field of Search ........................ 296/65 R, 65 A; 297/216, 15, 331, 335, 336; 248/503.1

[56] References Cited

U.S. PATENT DOCUMENTS

| 3,460,791 | 8/1969 | Judd | 297/216 X |
| 3,531,154 | 9/1970 | Fleche | 296/65 A |
| 4,194,782 | 3/1980 | Itoh | 296/65 R |
| 4,700,989 | 10/1987 | Ercilla | 296/65 R X |
| 4,759,580 | 7/1988 | Berklich, Jr. et al. | 296/65 R |

Primary Examiner—Dennis H. Pedder
Attorney, Agent, or Firm—Krass & Young

[57] ABSTRACT

A seat riser for use with a motor vehicle of the type having longitudinally spaced and laterally extending front and rear floor mounted strikers to removably mount the associated seat in the vehicle. The riser includes a longitudinal frame structure, a fork member at the front of the frame structure having a downwardly opening slot for receipt of the front floor striker, mounting means at the rear of the frame structure defining an obliquely upwardly and rearwardly extending ramp edge adapted to be positioned above and forwardly of the rear striker, and a latching mechanism operative to move the ramp edge downwardly and forwardly with respect to the rear striker and urge a latching edge defined by the fork structure at the front of the riser resiliently against the rear of the front striker in response to movement of said latching mechanism from a latched to a locked position.

34 Claims, 5 Drawing Sheets

—— LATCH
--- LATCH & LOCK

SEAT RISER

BACKGROUND OF THE INVENTION

This invention relates to motor vehicle seats and more particularly to motor vehicle seats of the type which are removably mounted within the vehicle.

In various types of motor vehicles, including vehicles of the utility or of van type, it is common practice to provide rear passenger seats that can be readily removed from the vehicle to increase the cargo carrying capacity of the vehicle. Ideally, these seats are readily positioned in the vehicle in firm locking relationship to the vehicle and are readily removed from the vehicle by a simple, low effort operation on the part of the vehicle operator. Further, the seat should not generate any rattling or other noises when in its mounted position within the vehicle and should provide adequate anchoring support for the seat belts required for the seat passengers. Further, the seat should satisfy all of these requirements while yet maintaining a relatively lightweight construction so as to minimize the additional vehicle weight attributable to the seat and so as to simplify the seat removal and reinstallation process. Further, the overall seat structure, including the mechanism required to maintain the seat in its mounted position within the vehicle, should be relatively inexpensive so as not to add unduly to the overall cost of the total vehicle.

Various attempts have been made to provide movable vehicle seats satisfying all of the above requirements. However, each of the prior art removable seat constructions has satisfied certain of the above requirements only by compromising with respect to the remaining requirements. For example, removable seat constructions have been provided that are relatively inexpensive and relatively lightweight, but these constructions have been prone to rattling and/or have required a very difficult installation and removal procedure. As a further example, certain prior art removable seat constructions have satisfactorily addressed the problem of securely locking the seats in their mounted position within the vehicle, but only at the expense of providing an extremely heavy and expensive seat construction and/or a construction in which removal of the seat is extremely difficult.

SUMMARY OF THE INVENTION

This invention is directed to the provision of a removable seat construction which is not prone to rattling, is lightweight, is easy to remove from the vehicle, and inexpensive in construction.

More specifically, this invention is directed to the provision of a seat riser for use with a removable motor vehicle seat and which provides a seat latching mechanism which is rattle free, easy to operate, and inexpensive.

More specifically, this invention is directed to the provision of a seat riser for a removable motor vehicle seat in which the riser is constructed to deliberately collapse in impact situations in a manner to direct the loading close to the plane of the floor to optimize the ability of the vehicle floor to absorb the loading.

The invention seat riser is intended for use with a motor vehicle of the type having longitudinally spaced and laterally extending floor mounted strikers to removably mount the associated seat in the vehicle. According to the invention, the riser comprises a longitudinally extending frame structure; front mounting means at the front of the frame structure defining a downwardly extending latching edge adapted to be positioned rearwardly of the front striker; rear mounting means at the rear of the frame structure defining an obliquely upwardly and rearwardly extending ramp edge adapted to be positioned above and forwardly of the rear striker; and a latching mechanism operative to move the ramp edge downwardly and forwardly with respect to the received rear striker and urge the latching edge of the front mounting means forwardly against the rear of the received front striker. This arrangement allows the associated seat to be readily positioned with respect to the floor strikers of the vehicle and allows the seat to be thereafter quickly and efficiently moved into firm locking engagement with the floor mounted strikers in response to operation of the latching mechanism.

According to a further feature of he invention, the latching mechanism forms a part of the rear mounting means. This arrangement allows the latching mechanism to be readily accessed from the rear of the seat following positioning of the front and rear mounting means adjacent the front and rear strikers.

According to a further feature of the invention, the latching mechanism defines a cam surface for downward camming coaction with a cam surface on the frame structure above the ramp edge, and the latching mechanism cam surface coacts with the frame structure cam surface in response to movement of the latching mechanism to its locked position to move the ramp edge downwardly and forwardly with respect to the rear striker and urge the latching edge of the front mounting means forwardly against the rear edge of the front pin. This arrangement provides a simple and effective means of providing the required downward and forward movement of the ramp edge relative to the rear pin and the required urging movement of the latching edge of the front mounting means against the front pin.

According to a further feature of the invention, the latching mechanism includes a hook member having a lower hook portion sized to grasp the under side of the rear striker and the upward force exerted on the latching mechanism cam surface as the frame structure is moved downwardly by the coaction of the cam surfaces is reacted by the engagement of the hook member hook portion with the rear striker. This arrangement provides a convenient and efficient means of reacting the generated cam forces and forcing the ramp surface downwardly and forwardly relative to the rear striker.

According to a further feature of the invention, the upper end of the hook member carries a pivot pin; the latching mechanism further includes an operator lever pivotally mounted at its lower end on the pivot pin and including a handle portion at its free end; and the latch mechanism cam surface is provided on the operator lever. This arrangement provides a simple and efficient structure for translating latching movement of the operator lever into the required downward and forward movement of the ramp edge relative to the rear striker.

According to a further feature of the invention, the frame structure includes a vertically extending guide slot above the ramp edge and the pivot pin is received in the guide slot and moves from a position proximate the lower end of the guide slot to a position proximate the upper end of the guide slot as the rear portion of the frame structure moves downwardly and forwardly in response to movement of the latching mechanism from its latched to its locked position. This arrangement provides an efficient means of positively guiding the latch mechanism in its movement between its latched and locked positions.

According to a further feature of the invention, the ramp edge, guide slot, and the frame structure camming surface are essentially in a vertical line, respectively one above the other. This arrangement provides a mechanically force efficient structure for providing the desired downward and forward movement of the ramp edge relative to the rear striker in response to movement of the operating lever.

According to a further feature of the invention, the front mounting means comprises a fork structure carried by the front end of the frame structure and defining a slot means for receipt of the front striker; the latching edge comprises a rear edge of the slot means; and the latching mechanism has unlatched, latched and locked positions and is operative when moved to its locked position to urge the latching edge forwardly against the received front striker. This arrangement provides a slot for receipt of the front striker to allow the seat to be moved pivotally about the axis of the front striker, and further provides the required latching edge for coaction with the front striker in the locked position of the latch mechanism.

According to a further feature of the invention, the fork structure includes a rigid fork member rigid with the frame structure and a resilient member defining the latching edge and resiliently urged forwardly against the received front striker in response to movement of the latching mechanism from its latched to its locked position. This arrangement allows the front latching edge to be spring loaded against the front striker in response to operation of the latching mechanism.

According to a further feature of the invention, the rigid fork member defines a slot constituting a part of the slot means; the resilient member includes a cantilever portion rigid at its upper end with the frame structure and projecting downwardly in cantilever fashion to present a front edge spaced forwardly from the rear edge of the rigid fork member slot and constituting the latching edge for coaction with the received front striker.

According to a further feature of the invention, the resilient member comprises a fork member positioned laterally of the rigid member, secured to the frame structure, and having front and rear fork portions defining a slot therebetween for coaction with the rigid member slot to define the slot means; the cantilever portion is the rear fork portion of the resilient member; and the front fork portion of the resilient member intrudes at its lower end into the entrance to the rigid member slot and yields resiliently to allow entry of the front striker into the slot means.

According to a further feature of the invention, the rigid member slot includes a rearwardly extending arcuate portion, and the latching edge, as defined by the front edge of the rear fork portion of the resilient member, intersects the arcuate portion in secant fashion. This arrangement allows the latching edge to engage the rear edge of the front striker during the operation of the latching mechanism and allows the cantilever portion of the resilient member to pivot relative to the rigid fork member and spring load itself against the front striker in response to operation of the latching mechanism.

According to a further feature of the invention, the latching mechanism further includes spring means operative to urge the latching mechanism from its unlatched position to its latched position and further includes means operative in response to movement of the latching mechanism from its latched to its unlatched position to maintain the latching mechanism in its unlatched position against the bias of the spring means. This arrangement allows the vehicle operator to move the latching mechanism associated with one of the seat risers of the associated seat to an unlatched position and thereafter move the latching mechanism of the other seat riser to an unlatched position while insuring that the latching mechanism of the first riser remains in its unlatched position so as to enable the seat to thereafter be pivoted upwardly about the front pin for subsequent removal from the vehicle.

According to a further feature of the invention, the hook portion of the hook member of the latching mechanism is positioned proximate the rear striker in the latching position of the latching mechanism and is pivoted to a position clear of the rear striker in the unlatched position of the latching mechanism; the spring means comprises a spring operative to urge the hook member toward its latching position; and the means maintaining the latching mechanism in its unlatched position comprises a detent portion on the hook member between the hook portion thereof and the upper end thereof sized to hang up on the rear striker as the hook member is moved to its unlatched position.

According to a further feature of the invention, the spring is operative to urge the latching mechanism downwardly relative to the frame structure with such relative downward movement being accommodated by relative downward movement of the pivot pin in the slot, and the spring acts to move the hook member downwardly as the hook member is moved toward its unlatched position to move the detent portion of the hook member into interfering relation with the rear striker. This arrangement allows the spring to move the hook member downwardly as the latching mechanism is moved toward its unlatched position to facilitate the interfering engagement of the detent portion of the hook member with the rear pin.

According to a further feature of the invention, the detent portion of the hook member is configured to remain engaged with the rear striker upon upward pivotal movement of the associated seat about the front mounting means for a time sufficient to preclude latching engagement of the hook portion with the rear striker as the hook member moves to its latched position under the urging of the spring following disengagement of the detent portion from the rear striker. This arrangement insures that, after the latching mechanisms of both seat risers have been moved to their unlatched positions, the seat may be thereafter pivoted upwardly about the front mounting means without reengagement of the hook members of the latching mechanisms with the rear strikers.

According to a further feature of the invention, the latching mechanism includes means to prevent inadvertent movement of the latching mechanism to a locked position when the seat is disengaged from the strikers and placed on a storage surface. This arrangement ensures that the seat can be readily reinstalled on the strikers without requiring the .cp3 operator to manually move the latch mechanism back to it latched position.

According to a further feature of the invention, the latching mechanism further includes means to ensure that the latching mechanism will in fact return to its locked position in a situation where the operator moves the latch to an unlatched position and then changes his mind and attempts to move the latching mechanism back to its locked position. This arrangement ensures that the hook member of the latching mechanism will always in fact move back to its locked position when the operating lever is moved to its locked position.

DETAILED DESCRIPTION OF THE PREFERRED EMBODIMENT

Figures 1, 6, 7:
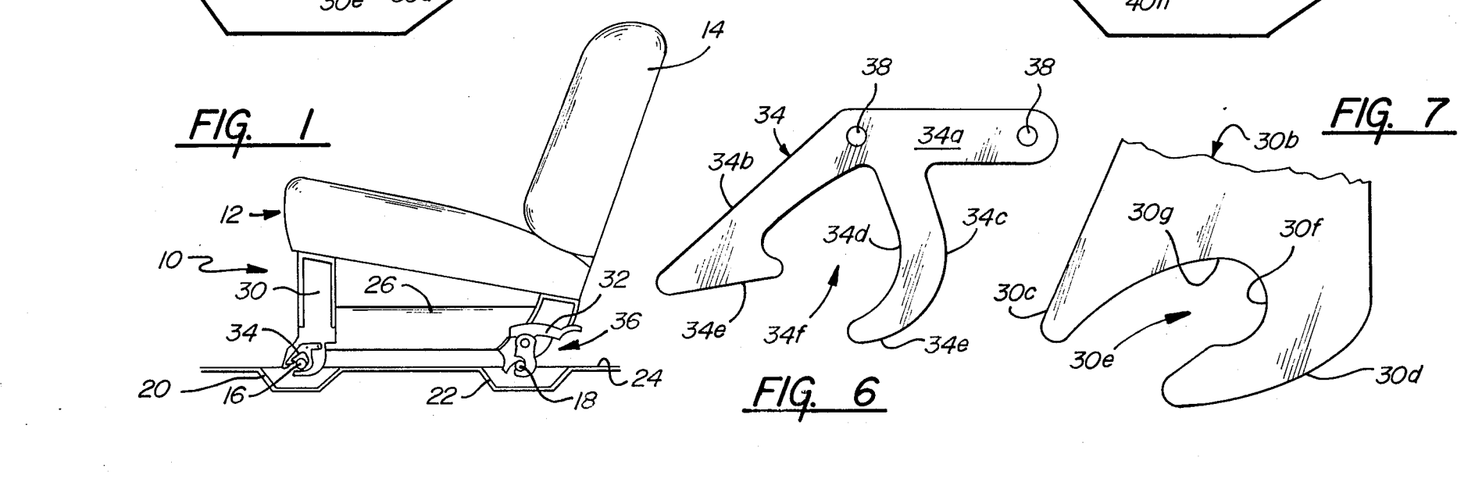
FIG. 1 is a view of a removable vehicle seat embodying the invention seat riser.
FIGS. 3, 4, 5, 6, 7, 8 and 9 are views of various components of the invention seat riser.

The invention seat riser 10 is adapted for use with a seat of the type including a seat cushion 12 and a seat back 14. It will be understood that the seat includes frame means rigidly interconnecting the seat cushion and the seat back and that a pair of seat risers 10 are employed, one adjacent each lateral side of the seat. Specifically, although the invention is described in detail with respect to the seat riser 10 employed adjacent the left lateral side of the seat assembly, it will be understood that a similar seat riser is employed in association with the right lateral side of the seat assembly.

It will further be understood that the invention seat riser is intended for use with a movable seat assembly, for example, a rear seat assembly in a van-type vehicle, and coacts with longitudinally spaced and laterally extending front and rear floor mounted strikers 16 and 18 provided in wells 20 and 22 in the floor 24 of the vehicle. Strikers 16 and 18 are illustrated as pins but may in fact constitute any rigid floor mounted members capable of being latchingly engaged by the invention latching mechanism.

Figure 2:
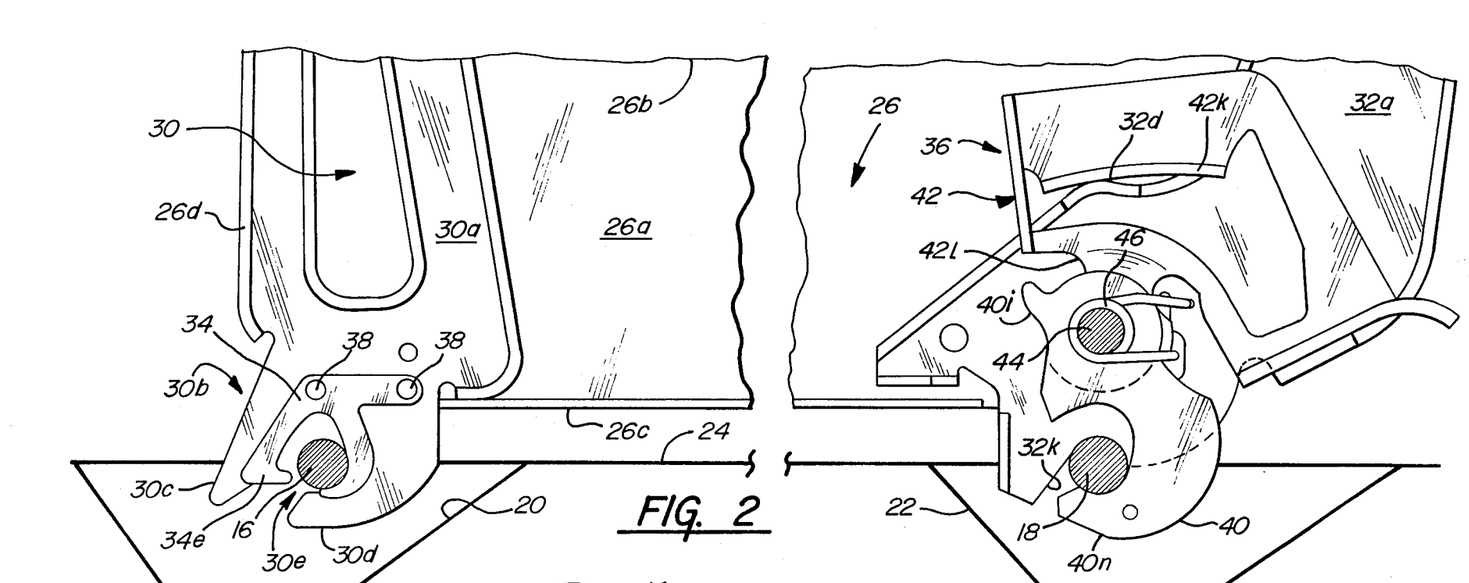
FIG. 2 is a side elevational view of the invention seat riser.
Figures 3, 4, 5:
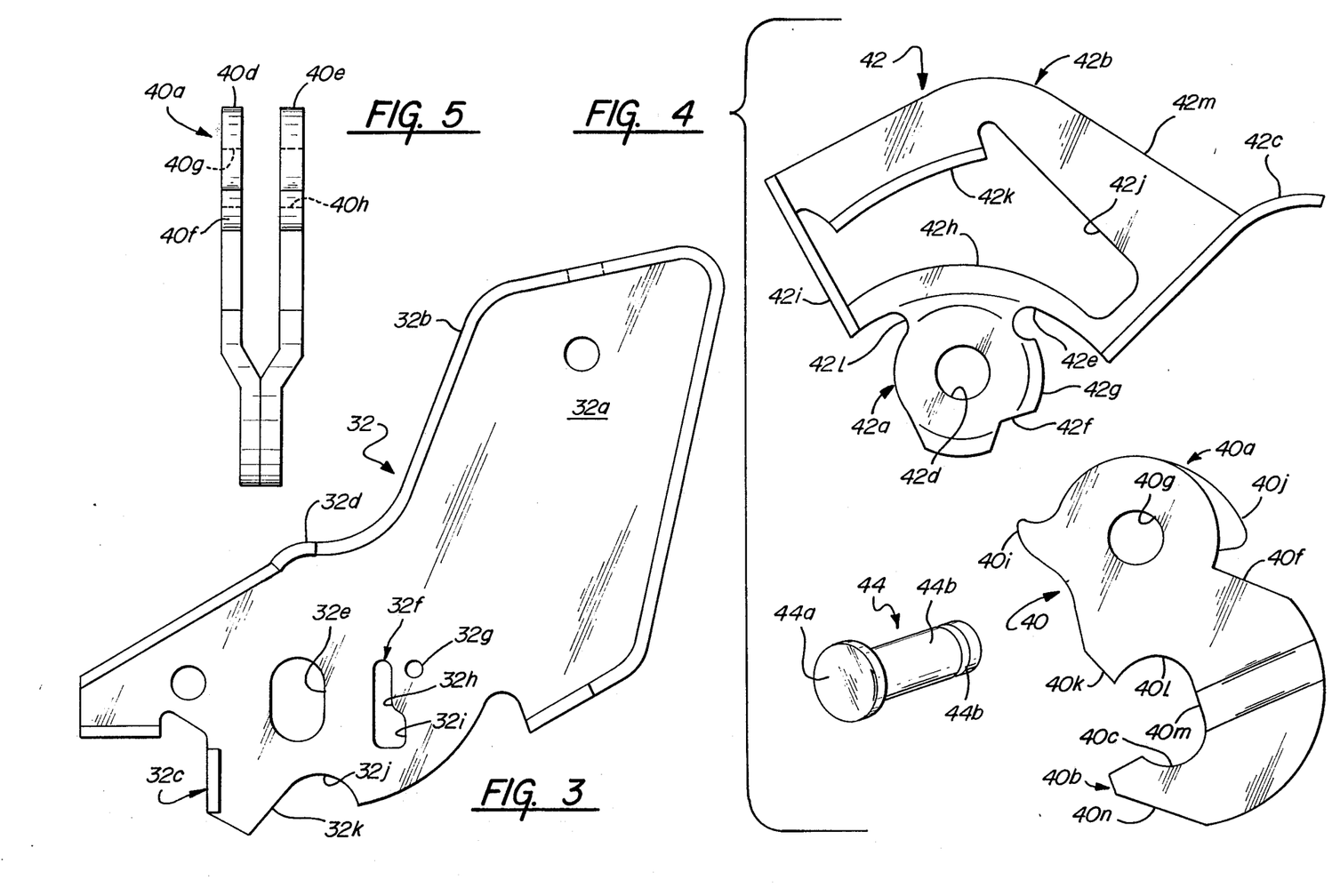

The invention seat riser, broadly considered, includes a cover 26, a front support 30, a rear support 2, a spring 34, and a latching mechanism 36. Cover 26, front support 30, and rear support 32 together define a longitudinally extending frame structure for the seat riser.

Cover 26 is formed as a sheet metal stamping and includes a main body portion 26a, an upper flange portion 26b, a lower flange portion 26c, a front flange portion 26d, and a recessed pocket portion 26e.

Front support 30 is formed as a sheet metal stamping and includes a main body post portion 30a and a lower fork portion 30b. Fork portion 30b includes front and rear fork portions 30c and 30d defining an upwardly and rearwardly extending forwardly opening slot 30e therebetween. Slot 30e includes a rearwardly extending upper slot portion 30f and a latching surface 30g is defined at the upper end of slot 30e. Front support 30 is suitably secured as by welding to the forward portions of cover 26 with fork portion 30c extending downwardly beneath the plane of the lower edges of cover 26 to provide a rigid fork structure for entry into well 20 and coaction with the front pin 16.

Spring member 34 is formed of a suitable plastic or other resilient material and has a forked configuration including a main body portion 34a, a front fork portion 34b and a rear fork portion 34c. Rear fork portion 34c extends downwardly in cantilever fashion from main body portion 34a and defines a latching edge 34d for coaction with the rear edge of front pin 16 and front fork portion 34b includes a latch portion 34e adjacent the entrance to the slot 34f defined between fork portions 34b and 34c. Spring member 34 is secured to fork portion 30b of front support 30 as by rivets 38 with latch portion 34e of front fork portion 34b intruding into the entrance to the slot 30e defined by fork portion 30b and with latching edge 34d, defined on rear fork portion 34c, downwardly intersecting rearwardly extending slot portion 30f forwardly of the rear edge of slot 30e.

Rear support 32 is formed as a sheet metal stamping and includes a main body post portion 32a including a flange 32b, and a lower latch portion 32c. A cam member 32d of generally arcuate configuration projects laterally from flange 32b; a vertical pin slot 32e is provided in main body portion 32a immediately below and in vertical alignment with cam member 32d; a spring guide slot 32f is provided in main body portion 32a in rearwardly spaced relation to pin slot 32e; and a spring anchor hole 32g is provided in main body portion 32a rearwardly of the upper end of spring guide slot 32f. Spring guide slot 32f includes a relatively narrow upper portion 32h and a relatively wide lower portion 32i. Latch portion 32c includes an arcuate seating surface 32j and an obliquely upwardly and rearwardly extending latching ramp edge 32k positioned generally vertically below cam portion 32d and pin guide slot 32e and blending at its upper end into seating surface 32j. Rear support 32 is suitably secured as by welding to the rear portions of cover 26 with latch portion 32c extending downwardly beneath the plane of the lower edges of cover 26 and cover support 28 for entry into rear well 22 and coaction with the rear pin 18.

Latch mechanism 36 includes a hook member 40, an operating lever 42, a pin 44 and a spring 46.

Hook member 40 is formed as a sheet metal stamping and includes an upper portion 40a and a lower hook portion 40b. Lower hook portion 40b includes an arcuate latching surface 40c sized to grasp the underside of rear pin 18. Upper hook portion 40a is bifurcated to define laterally spaced halves 40d and 40e each defining a shoulder surface 40f and respectively defining aligned apertures 40g and 40h. Half 40d includes a tang portion 40i and half 40e includes a spring wiper portion 40j. Each half also defines a detent portion 40k and an arcuate surface 40l connected to arcuate seating surface 40c by a straight edge 40m. A cam surface 40n is defined on the lower edge of lower hook portion 40b.

Operating lever 42 is formed as a sheet metal stamping and includes a lower end portion 42a and an upper or free end portion 42b displaced generally laterally rearwardly from lower end portion 42a and terminating in a handle portion 42c. Lower end 42a includes a central aperture 42d corresponding in size to apertures 40g and 40h in hook member 40; a cut out 42e; a lock and cam face 42f; and a guide surface 42g. Upper portion 42b includes spaced upper and lower arm portions 42m and 42h extending between handle 42c and a flange 42i and defining an opening 42j therebetween. An arcuate flange cam portion 42k is provided on upper arm portion 42m. Cam portion 42k extends obliquely rearwardly and upwardly so as to define successive locii therealong successively more distant from the center of aperture 42d as measured in a direction toward the free end of the operating lever. An abutment surface 42l is defined between lower end portion 42a and arm portion 42h for coaction with tang portion 40i on hook member half 40d.

Pin 44 includes a head portion 44a and a shank portion 44b including a groove 44c for coaction with a snap lock member. Shank portion 44b is sized to fit snugly in apertures 40g, 42d, and 40h and to slide easily but snugly in slot 32e.

Spring 46 includes a main body coil portion 46a, an upper end portion 46b, and a lower end portion 46c terminating in a laterally extending guide portion 46d.

In the assembled relation of latching mechanism 36 on the seat riser, the bifurcated upper end of hook member 40 straddles the lower end of operating lever 42 with the inner arm 40e positioned in the pocket portion 26e of cover 26; pin shank portion 44b passes successively through aperture 40g, aperture 42d, slot 32e and aperture 40h to dispose the inner end of the shank portion within pocket 26e for suitable receipt of a snap lock member for coaction with groove 44c; spring main body portion 46a is wound concentrically around pin shank portion 44b; spring upper end portion 46b is engaged in hole 32g in rear support 32; spring lower end guide portion 46d is biased downwardly against shoulder surfaces 40f and passes through guide slot 32f; and arcuate cam portion 32d of rear support 32 engages arcuate cam portion 42k of operating lever 42. In this assembled relation, spring 46 urges hook member 40 for movement in a clockwise direction and also urges the hook member and operating lever assembly to move downwardly relative to the rear support 32 with such downward movement being guided by sliding movement of pin 44 in slot 32e. Latching mechanism 36 is movable between a transient unlatched position as seen in FIG. 10, a latched position as seen in FIG. 11, and a locked position as seen in FIG. 12.

Figures 8, 9, 10, 11:
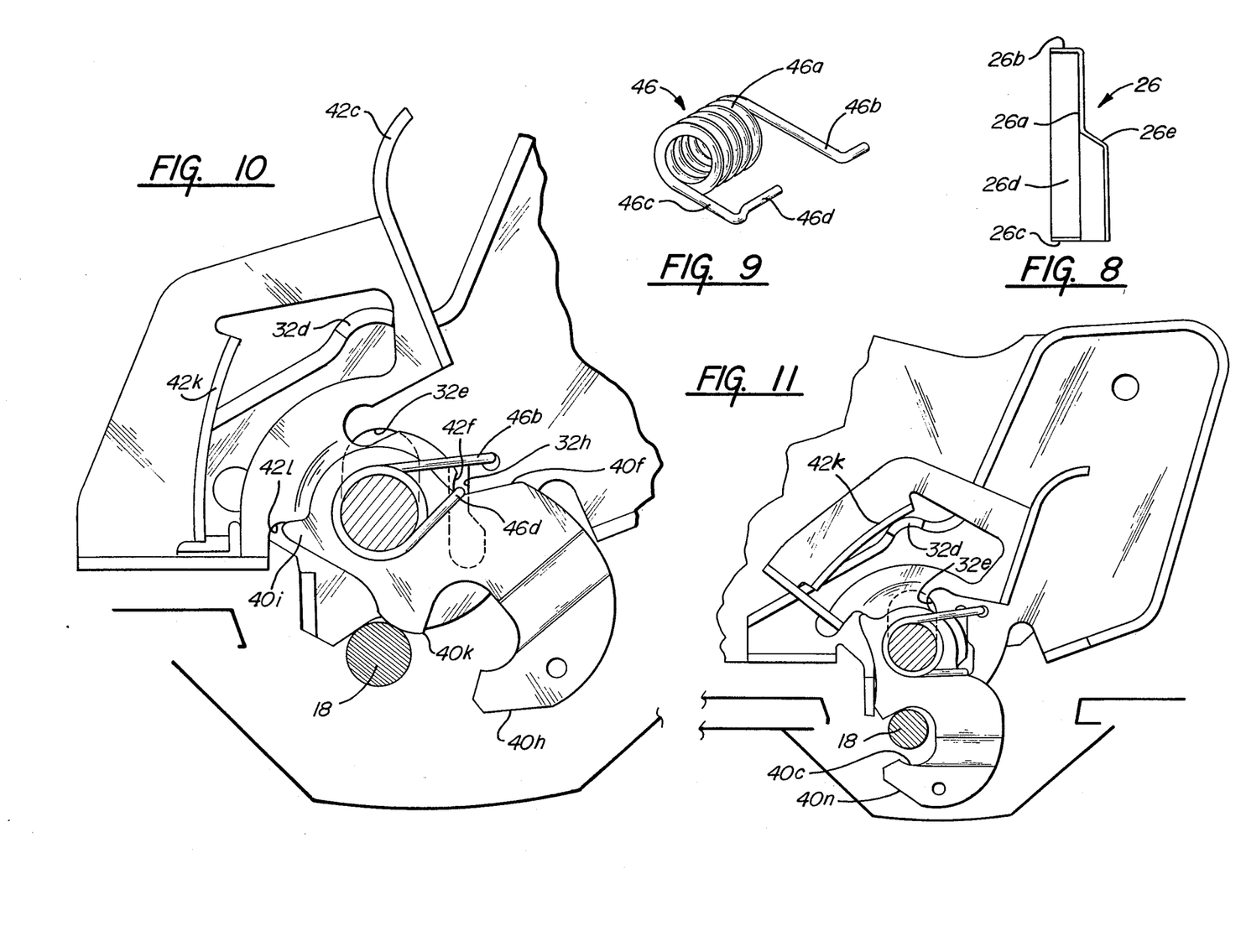
FIGS. 10, 11 and 12 respectively show the latching mechanism of the invention seat riser in its unlatched, latched and locked positions.

In the transient unlatched position of FIG. 10, cam portions 32d and 42k are disassociated, pivot pin 44 is positioned in the bottom of slot 32e, spring guide portion 46d is positioned in the narrow upper portion 32h of spring guide slot 32f, and hook member 40 is pivoted upwardly in a counter-clockwise direction about the axis of pin 44 by the interengagement of operating lever abutment surface 42l and hook member tang portion 40i.

In the latched position of FIG. 11, the upper end of operating lever cam portion 42k is engaged with cam portion 32d, pivot pin 44 is positioned in the lower end of slot 32e, spring guide portion 46d is positioned in the wide lower end portion 32i of spring guide slot 32f, and hook member 40 is pivoted by spring 46 to a generally vertically downwardly extending position in which seating surface 40c is positioned generally vertically below support member seating surface 32j and in general vertical alignment with pivot pin 44 and cam 32d with tang 40i continuing to engage abutment surface 42l on operating lever 42.

Figure 12:
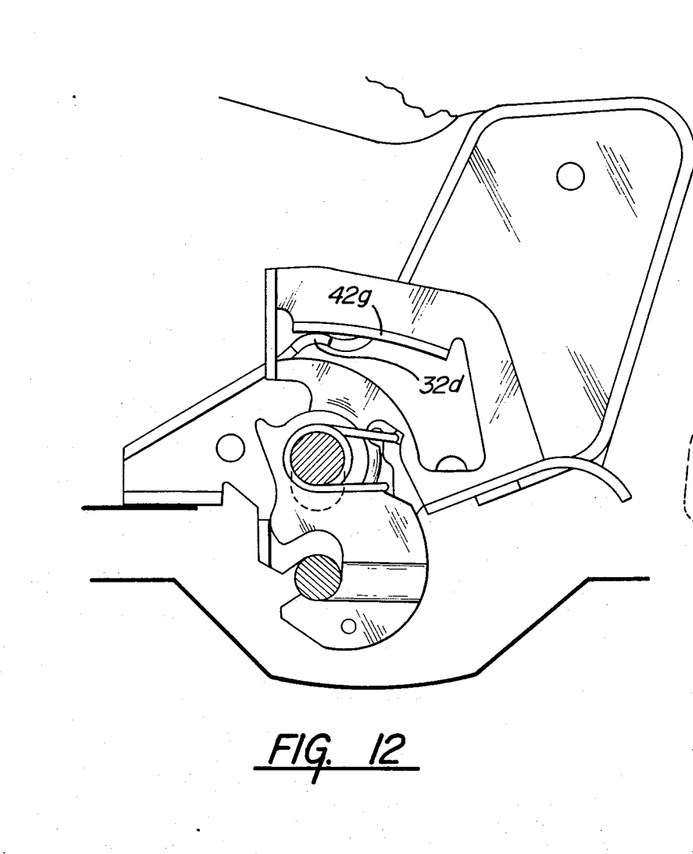

In the locked position of FIG. 12, the forward end of cam 42g is in engagement with cam portion 32d, pin 44 is proximate the upper end of slot 32e, spring guide portion 46d is positioned in the wide lower end portion 32i of spring guide slot 32f, hook member 40 continues to be disposed in a generally downwardly vertically disposed position but raised with respect to rear support 32, and operating lever abutment surface 42l has moved away from tang portion 40i.

The operation of the invention seat riser will now be described, first with respect to installation of the associated seat in the vehicle and then with respect to removal of the associated seat from the vehicle. With the seat removed from the vehicle, the latching mechanism is maintained in the latched position of FIG. 11 by the action of spring 46 which has returned the latching mechanism to the latching position of FIG. 11 from the transient unlatched position of FIG. 10 upon the previous removal of the seat from the vehicle. To install the seat in the vehicle, the lower latch portion 30b of front support 30 is passed downwardly and forwardly over front striker pin 16 with latch portion 34e of spring 34 yielding to allow the entry of the pin into slot 30e and thereafter snapping back to a position partially closing the entrance to the slot. As front striker pin 16 enters slot 30e it moves into solid engagement with latching surface 30g and into resilient engagement with latching edge 34d of cantilever fork portion 34c of spring member 34. The seat is now pivoted downwardly about the axis of front striker pin 16 to bring latching mechanism 36 into coaction with rear striker pin 18. Specifically, as the seat is pivoted downwardly with the latching mechanism in the latched position of FIG. 11, rear striker pin 18 engages the cam surface 40n defined on the lower 40b of hook member 40 to move the hook member in a counterclockwise direction about the axis of pivot pin 44 and allow striker pin 18 to pass upwardly into engagement with ramp edge 32k, whereafter hook member 40 is pivoted by spring 46 in a clockwise direction to return the latch to its latched position of FIG. 11 with the hook portion 40b of the hook member positioned generally beneath rear striker pin 18 to loosely capture rear pin 18 and preclude upward pivotal movement of the seat about the axis of front pin 16. The seat is now latched to the striker pins 16 and 18 but is not yet locked with respect to these pins.

Figure 13:
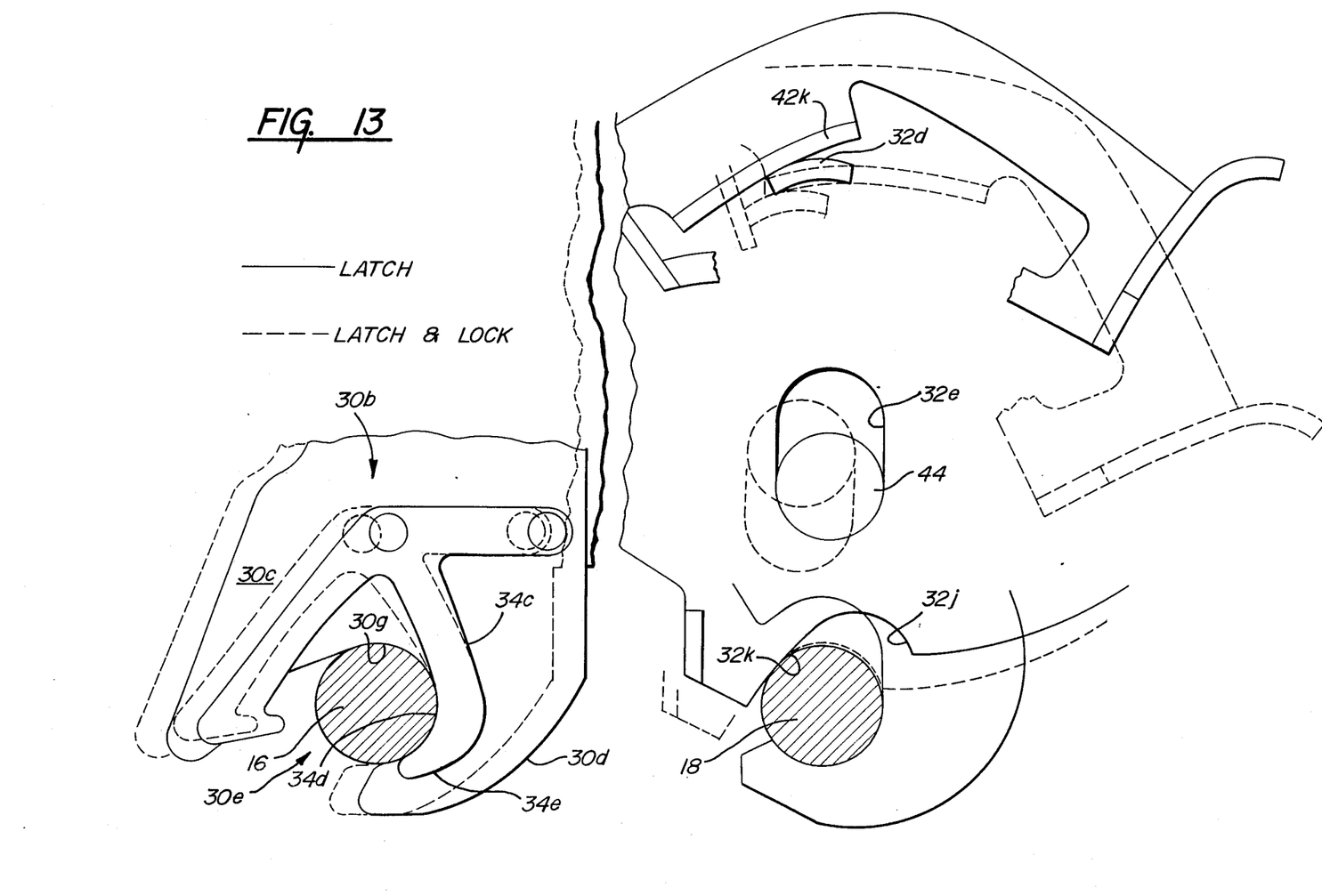
FIG. 13 is a schematic view illustrating the manner in which the invention seat riser lockingly engages the floor pins of the associated vehicle as the latching mechanism is moved from its latched to its locked positions.

The latched position of the striker pin 18 with respect to ramp edge 32k and the latched position of striker pin 16 with respect to latching edge 34d is seen in solid lines in FIG. 13. As the latching mechanism is now moved to the locked position of FIG. 12, the various elements seen in FIG. 13 move to their dotted line or locked positions. Specifically, as operating lever 42 is pivoted about the axis of pivot pin 44 to its locked position, cam portion 42g rides upwardly along cam portion 32d to move the latch mechanism upwardly relative to rear support 32 with the relative movement being accommodated by upward relative movement of pivot pin 44 in guide slot 32e. The actual movement as the latching mechanism moves from its latched to its locked position takes place in the seat riser since the hook portion of the hook member quickly engages the under side of striker pin 18 so that the force thereafter exerted as between cam portions 32d and 42k is reacted by the engagement of hook portion 40b with rear striker pin 18 and the rear end of the seat riser is pulled downwardly and forwardly relative to striker pin 18. As the seat riser is pulled downwardly relative to striker pin 18, striker pin 18 slides upwardly and rearwardly along ramp edge 32k to seat in seating surface 32j. The resultant concomitant forward movement of the front end of the seat riser causes cantilever portion 34c of spring 34 to pivot rearwardly to load latching edge 34d against the rear edge of pin 16 so that the downward and forward movement of the rear end of the seat riser upon movement of the latching mechanism from its latched to its locked position simultaneously loads ramp edge 32k against rear striker pin 18 and loads latching edge 34d resiliently against front striker pin 16 so that the riser is firmly locked to both the front and rear pins so as to preclude rattling as between the portions of the invention seat riser engaging the front pin and as between the portions of the invention seat riser engaging the rear pin. Since the lower end 34e of spring arm 34c angles downwardly and forwardly in wrapping relation around the rear underside of pin 16, the force exerted at edge 34d against front striker pin 16 also has a vertical component and this component serves to force pin 16 upwardly into firm, spring loaded engagement with latching surface 30g to further lock front striker pin 16 with respect to the riser.

When it is desired to remove the associated seat from the vehicle, the latching mechanisms associated with the left and right seat risers are moved to their unlatched positions of FIG. 10 and the seat is pivoted upwardly about front pin 16 and thereafter lifted clear of the front pins to allow removal of the seat from the vehicle.

Since the width of the seat precludes simultaneous movement of the latching mechanisms of the left and right risers to their unlatched positions by a single operator, means are provided to allow one of the latching mechanisms to be moved to its unlatched position and maintained in that position while the operator moves the other latching mechanism associated with the other riser to its unlatched position. The means for maintaining the latching mechanism in its unlatched position is best seen in FIG. 10 wherein detent portion 40k is seen in interfering or hung-up relation on pin 18 so as to preclude return movement of hook member 40 to its latched position until the seat assembly is moved upwardly to clear detent portion 40k from the pin. The interfering engagement of detent portion 40k with pin 18 as the latch mechanism is moved to its unlatched position is facilitated by spring 46 which moves operating lever 42, pin 44, and hook member 40 downwardly in slot 32e as soon as cam portion 42k clears cam 32d so as to move detent portion 40k downwardly into interfering relation with pin 18 and preclude return movement of the hook portion to its latched position until the pin has been cleared. Once the latching mechanism associated with the riser on one side of the seat assembly has been moved to its unlatched position, the operator may thereafter move the latching mechanism associated with the riser on the other side of the seat to its unlatched position and may thereafter pivot the seat upwardly about front pins 16 to allow removal of the seat from the vehicle. The detent portion 40k of the hook member is configured such that the detent portion remains engaged with the pin upon upward pivotal movement of the associated seat about the front mounting means for a time sufficient to preclude relatching engagement of the hook member with the rear striker pin as the hook member moves to its latched position under the urging of the spring following disengagement of the detent portion from the rear pin.

The invention latching mechanism also includes provision to ensure that the latching mechanism does not move to a locked position when the seat is removed from the striker pins and set down, either short term or long term, on a support surface. Specifically, following movement of the latching mechanism to its unlatched position to allow disengagement of the seat from the striker pins, spring 46 functions to thereafter move the latching mechanism to its latched position. When the removed seat is thereafter set down, the weight of the seat causes hook 40 to move upwardly to its locked position. This upward movement of the hook also moves the lever upwardly through the intermediary of the pivot pin and this upward movement of the lever can have the effect of disengaging cam 32d from cam 42k so that the lever may thereafter pivot by gravity to its locked position. If this happens, when the seat is thereafter raised off of the storage surface preparatory to reinstalling the seat in the vehicle, the locked position of the lever prevents the hook member from moving back to its latched position and the operator is required to manually move the latching mechanism back to its latched position to allow reinstallation of the seat. In the present invention, this eventuality is avoided by the fact that the spring guide portion 46d in the latched position of the mechanism is trapped in the crotch formed by lever lock face 42f and hook shoulder 40f. This trapped disposition of spring guide portion 46d is maintained as the hook and lever are moved upwardly as the removed seat is set on a storage surface and this trapped disposition of the spring guide portion, in blocking disposition relative to lever lock face 42f, prevents the lever from pivoting under gravity to its locked position so that when the seat is raised off of the storage surface preparatory to reinstallation of the seat, the hook and lever move downwardly to their latched positions to facilitate the reinstallation process.

The described arrangement, while avoiding inadvertent movement of the lever to its locked position, does not interfere with the intentional movement of the lever to its locked position in the course of the normal operation of the latch mechanism since the spring guide portion 46d rides readily up the lever cam and lock face 42f and onto arcuate guide surface 42g in response to operator pressure on the handle portion 42c with the resulting rearward movement of spring guide portion 46d being accommodated by the wide lower end portion 32i of spring guide slot 32f. In the event that burrs or other imperfections are present on surface 42g and the spring guide portion 46d hangs up on the burrs as the lever is subsequently moved from its locked to its latched position, spring wiper portion 40j on hook arm portion 40e functions to wipe the spring guide portion off of guide surface 42g and allow the spring guide portion to return to its trapped position between the crotch between lever lock face 42f and hook shoulder 40f.

The invention locking mechanism also includes provision to ensure that the latching mechanism will again move to a locked position in the situation where the operator, with the seat installed, moves the locking mechanism to an unlatched position and then changes his mind and decides to move the latching mechanism back to its locked position. There is a danger in this situation that the subsequent movement of the lever back to the locked position will not have the effect of moving the hook to its locked position and the operator may thereby be given a false sense that the latching mechanism has been locked to the striker pin whereas in fact the lever has moved to the locked position but the hook remains in the unlatched or the latched position. This possibility is avoided in the invention locking mechanism by the fact that, as the lever is moved to the unlatched position, spring guide portion 46d moves upwardly into the narrow upper portion 32h of the spring guide slot 32f so that, if the operator changes his mind about removing the seat and thereafter moves the lever back to its locked position, the spring guide portion 46d will be trapped in the narrow upper slot portion 32h with the result that the spring guide portion is trapped in the crotch between surfaces 42f and 40f and cannot move rearwardly out of that crotch so that the hook must follow the locking movement of the lever, thereby avoiding the possibility of a false signal that the locking mechanism has moved back to its locked position when in fact the hook is still in its unlatched or latched position.

The invention seat riser will be seen to provide many important advantages as compared to prior art seat riser constructions. Specifically, the invention seat riser is relatively lightweight and relatively inexpensive in construction and yet functions to firmly and positively lock the seat riser to both the front and rear pins of the associated vehicle to positively preclude rattling as between the seat assembly and the pins. The invention seat riser also greatly facilitates the installation and removal of the associated seat from the vehicle since the front pins may be easily viewed by the operator as he is maneuvering the seat into position and the front pins are firmly and positively engaged by latch portion 34e of spring 34 to maintain the front of the seat in latching engagement with the front pins so that the seat need only thereafter be dropped for pivotal movement about the axis of the front pins to move the latching mechanisms into latching engagement with the rear pins whereafter the operating levers may be simply and quickly pulled down to their locked positions.

The invention seat riser also includes provision to avoid movement of the latching mechanism to its locked position when the seat is set on a storage surface, and further includes provision to ensure that the locking mechanism will firmly reengage the striker pin in the event that the operator moves the latching mechanism to an unlatched position and then changes his mind and attempts to move the latching mechanism back to its locked position.

Figure 14:
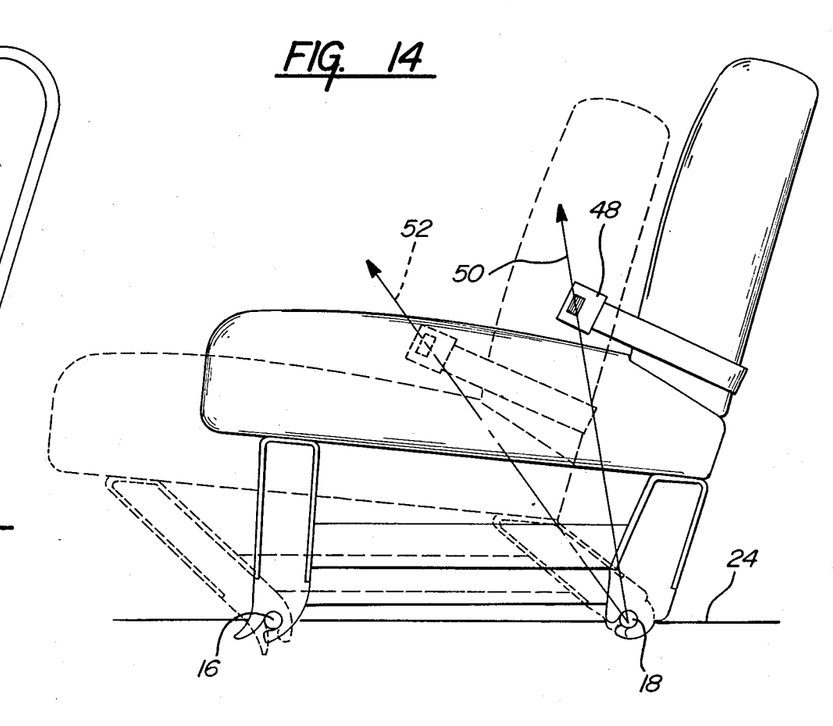
FIG. 14 is a diagrammatic view showing the manner in which the invention seat riser controllably collapses in an impact situation.

The invention seat riser also embodies a construction that operates in accident or impact situations to minimize the loading imparted to the floor of the vehicle through the seat assembly. Specifically, and as best seen in FIG. 14, in an accident situation, the invention seat riser is designed to purposely collapse and move from the solid line position of FIG. 14 to the dotted line position of FIG. 14 in which the loading imparted to the rear pin 18 through the seat belt 48 is moved from a line of action seen at 50 to a line of action seen at 52. The vertical force component tending to pull pin 18 out of the floor 24 with the line of action 50 is substantially greater than the component tending to pull the pin 18 out of the floor with the line of action 52 so that distorting movement of the pin 18 relative to the floor structure for a given impact loading is minimized and/or so that the floor reinforcing structure associated with the pin may be minimized for any given anticipated impact loading so as to reduce vehicle cost and vehicle weight. The movement of the line of action in the manner illustrated is made possible by the fact that the invention seat riser maintains firm latching engagement with the rear pin irrespective of the orientation of rear support 32 relative to the pin and by the further fact that the seat riser comprises relatively rigid front and rear support members 30, 32 interconnected by a relatively weak or flimsy like structure 26 which readily collapses in an accident situation to allow the seat to assume the collapsed dotted line position seen in FIG. 14 in which the line of action of the forces imparted to the pin 18 through the seat belt has been substantially lowered with a resultant substantial diminution in the upward component of the impact force imparted to the rear pin 18.

Whereas a preferred embodiment of the invention has been illustrated and described in detail it will be apparent that various changes may be made in a disclosed embodiment without departing from the scope or spirit of the invention.

We claim:

1. A seat riser for use with a motor vehicle of the type having longitudinally spaced and laterally extending front and rear floor mounted strikers to removably mount the associated seat in the vehicle, said riser comprising:
   (A) a longitudinally extending frame structure;
   (B) front mounting means at the front of said frame structure adapted to pivotally receive the front striker and defining a downwardly extending latching edge adapted to be positioned rearwardly of the received front striker;
   (C) rear mounting means at the rear of said frame structure defining an obliquely upwardly and rearwardly extending ramp edge adapted to be positioned above the rear striker; and
   (D) a latching mechanism, including a hook, having an unlatched position in which said hook is clear of the rear striker, a latched position in which said ram edge is positioned above said rear striker and said hook loosely captures the rear striker to preclude upward pivotal movement of the seat about the front striker, and a locked position, said latching mechanism being operative in response to movement of said latching mechanism from its latched to its locked position to move said ramp edge downwardly and forwardly with respect to the rear striker and urge said latching edge of said front mounting means forwardly against the rear of the received front striker.

2. A seat riser according to claim 1 wherein:
   (E) said rear mounting means forms part of said latching mechanism.

3. A seat riser according to claim 2 wherein:
   (F) said front mounting means comprises a forked structure carried by the front end of said frame structures and defining a slot means for receipt of the front striker; and
   (G) said latching edge comprises a rear edge of said slot means.

4. A seat riser according to claim 3 wherein:
   (H) said forked structure includes a rigid forked member rigid with said frame structure and a resilient member defining said latching edge and resiliently urged forwardly against the received front striker in response to movement of said latching mechanism from its latched to its locked position.

5. A seat riser according to claim 4 wherein:
   (I) said rigid forked member defines a forwardly opening slot constituting a part of said slot means;

(J) said resilient member includes a cantilever portion secured at its upper end to said frame structure and projecting downwardly in cantilever portion to present a front edge spaced forwardly from the rear edge of said rigid fork member slot and constituting said latching edge for coaction with the received front striker.

6. A seat riser according to claim 5 wherein:
(K) said resilient member comprises a forked member positioned laterally of said rigid member, secured at its upper end, and having a front fork portion and a downwardly extending rear fork portion defining a slot therebetween for coaction with said rigid member slot to define said slot means;
(L) said cantilever portion is the rear fork portion of said resilient member; and
(M) said front fork portion of said resilient member intrudes at a lower end into the entrance to said rigid member slot and yields resiliently to allow entry of the front striker into said slot means.

7. A seat riser according to claim 6 wherein:
(N) said rigid member slot includes a rearwardly extending portion; and
(O) said latching edge, as defined by the front edge of said rear fork portion of said resilient member, downwardly intersects said rearwardly extending slot portion.

8. A seat riser according to claim 2, wherein:
(F) said latching mechanism defines a cam surface for downward camming coaction with a cam surface on said frame structure above said ramp edge; and
(G) said latching mechanism cam surface coacts with said frame structure cam surface in response to movement of said latching mechanism to its locked position to move said ramp edge downwardly and forwardly with respect to the rear striker and urge said latching edge of said front mounting means forwardly against the rear of the received front striker.

9. A seat riser according to claim 8 wherein:
(H) said hook member includes a lower hook portion sized to graps the under side of the rear striker; and
(I) an upward force is exerted on said latching mechanism cam surface as said frame structure is forced downwardly by the coaction of said cam surfaces and this upward force is reacted by the engagement of said hook member hook portion with the rear striker.

10. A seat riser according to claim 9 wherein:
(J) the upper end of said hook member carries a pivot pin;
(K) said latching mechanism further includes an operating lever pivotally mounted at its lower end on said pivot pin and including a free end remote from said pivot pin defining a handle portion; and
(L) said latching mechanism cam surface is provided on said operating lever.

11. A seat riser according to claim 10 wherein:
(M) said latching mechanism cam surface comprises a downwardly facing surface on said operating lever and defines successive locii therealong successively more distant from the axis of said pivot pin.

12. A seat riser according to claim 11 wherein:
(N) said frame structure includes a vertically extending guide slot above said ramp edge; and
(O) said pivot pin is received in said guide slot and moves from a position proximate the lower end of said guide slot to a position proximate the upper end of said guide slot in response to the downward and forward movement of said frame structure in response to movement of said latching mechanism from its latched to its locked position.

13. A seat riser according to claim 12 wherein:
(P) said ramp edge, said guide slot, and said frame structure camming surface lie essentially in a straight line.

14. A seat riser according to claim 13 wherein:
(Q) said line is essentially vertical.

15. A seat riser according to claim 8 wherein:
(H) said front mounting means comprises a forked structure carried by the front end of said frame structure and defining forwardly opening slot means for receipt of the front striker;
(I) said latching edge comprises a rear edge of said slot means; and
(J) said latching mechanism is operated when moved to its locked position to urge said latching edge forwardly against the received front striker.

16. A seat riser according to claim 15 wherein:
(K) said fork structure includes a rigid fork member rigid with said frame structure and a resilient member defining said latching edge and resiliently urged forwardly against the received front striker in response to movement of said latching mechanism from its latched to its locked position.

17. A seat riser according to claim 16 wherein:
(L) said rigid forked member defines a forwardly opening slot constituting a part of said slot means; and
(M) said resilient member includes a cantilever portion secured at its upper end to said frame structure and projecting downwardly in cantilever fashion to present a front edge spaced forwardly from the rear edge of said rigid forked member slot and constituting said latching edge for coaction with the received front striker.

18. A seat riser according to claim 17 wherein:
(N) said resilient member comprises a forked member positioned laterally of said rigid member, secured at its upper end, and having a front portion coating with said cantilever portion to define a slot therebetween for coaction with said rigid member slot to define said slot means; and
(O) said front forked portion of said resilient member intrudes at a lower end into the entrance to said rigid member slot and yields resiliently to allow entry of the front strike into said slot means.

19. A seat riser according to claim 18 wherein:
(P) said rigid member slot includes a rearwardly extending portion; and
(Q) said latching edge, as defined by the front edge of said cantilever portion of said resilient member, downwardly intersects said rearwardly extending slot portion.

20. A seat riser according to claim 1 wherein:
(E) said latching mechanism further includes
 (1) spring means operative to urge said latching mechanism from its unlatched position to its latched position; and
 (2) means operative in response to movement of said latching mechanism from its latched to its unlatched position to maintain said latching mechanism in its unlatched position against the bias of said spring means.

21. A seat riser according to claim 20 wherein:

(F) said latching mechanism is associated with said rear mounting means;
(G) said hook member is pivotally mounted at its upper end and has a lower hook portion sized to grasp the underside of the rear striker;
(H) said hook portion is positioned proximate the rear striker in the latched position of said latching mechanism and is pivoted about its upper end to a position clear of the rear striker in the unlatched position of said latching mechanism;
(I) said spring means comprises a spring operative to urge said hook member toward its latched position; and
(J) said means operative to maintain comprises a detent portion on said hook member between said hook portion thereof and said upper end thereof sized to hang up on the rear striker as said hook member is moved to its unlatched position.

22. A seat riser according to claim 21 wherein:
(K) said upper end of said hook member carries a pivot pin;
(L) said latching mechanism further includes an operating lever pivotally mounted at a lower end on said pivot pin and including a handle portion at another end;
(M) said frame structure includes a vertically extending guide slot receiving said pivot pin;
(N) said spring is operative to urge said latching mechanism downwardly relative to said frame structure with such relative downward movement being accommodated by relative downward movement of said pivot pin in said slot; and
(O) said spring acts to move said hook member downwardly as said hook member is moved toward its unlatched position to move said detent portion into interfering relation with the rear striker.

23. A seat riser according to claim 22 wherein:
(P) said detent portion is configured to remain engaged with the rear striker upon upward pivotal movement of the associated seat about said front mounting means for a time sufficient to preclude latching engagement of said hook portion with the rear striker as said hook member moves to its latched position under the urging of said spring following disengagement of said detent portion from the rear striker.

24. A seat riser for use with a motor vehicle of the type having longitudinally spaced and laterally extending front and rear floor mounted strikers to removably mount the associated seat in the vehicle, said riser comprising:
(A) a longitudinally extending frame structure;
(B) front mounting means at the front of said frame structure defining a front opening for removable receipt of the front striker and including a front latching edge proximate the received front striker;
(C) rear mounting means at the rear of said frame structure defining a rear opening for removable receipt of the rear striker and including a rear latching edge proximate the received rear striker; and
(D) a latching mechanism, including a hook configured to capture one of the strikers, means mounting said hook for combined vertical and pivotal movement relative to said frame structure, and means for actuating said hook, said means for actuating being operative to move said hook pivotally and vertically relative to said one striker and coacting with said one striker to urge said front latching edge against the received front striker to preclude rattling as between said front mounting means and the front striker and urge said rear latching edge against the received rear striker to preclude rattling as a between said rear mounting means and the rear striker.

25. A seat riser according to claim 10 wherein:
(M) said latching lever and said hook member each have unlatched, latched and locked positions; and
(N) said latching mechanism further includes blocking means operative to preclude concomitant movement of said operating lever from its latched to its locked position in response to movement of said hook member from its latched to its locked position with the seat removed from engagement with the strikers.

26. A seat riser according to claim 25 wherein:
(O) said latching mechanism further includes a pivot pin pivotally interconnecting the upper end of said hook member and the lower end of said operating lever and a coil spring wrapped around said pivot pin and having a guide portion at one end thereof; and
(P) said blocking means comprises means maintaining said spring guide portion in the path of movement of said latching lever as said hook member moves from its latched to its locked position.

27. A seat riser according to claim 26 wherein:
(Q) said blocking means comprises an upwardly facing shoulder surface on said hook member against which said spring guide portion is downwardly biased and a downwardly facing lock face on the lower end of said latching lever forming a crotch with said shoulder surface on said hook member receiving said spring guide portion.

28. A seat riser according to claim 27 wherein:
(R) said lock face has a camming engagement with said spring guide portion so that said spring guide portion may be cammed out of said crotch in response to operator pressure on said latching lever to allow said latching lever to be moved from its latched to its locked positions.

29. A seat riser according to claim 28 wherein:
(S) said spring guide portion is received in a slot in said frame structure and said slot includes a relatively wide portion;
(T) said spring guide portion is received in said relatively wide slot portion with said latching mechanism in its latched position so as to allow the camming movement of said spring guide portion out of said crotch as said latch mechanism is moved from its latched to its locked position.

30. A seat riser according to claim 29 wherein:
(U) said relatively wide slot portion constitutes the lower portion of said slot;
(V) said slot further includes a relatively narrow upper portion sized to snugly receive said spring guide portion; and
(W) said spring guide portion moves upwardly into said narrow upper slot portion in response to movement of said latching mechanism from its latched to its locked position.

31. A seat riser according to claim 24 wherein:
(E) said hook mounting means comprises a pin and slot connection between said frame structure and said hook.

32. A seat riser according to claim 31 wherein:

(F) said latching mechanism further includes a spring urging said hook downwardly relative to said frame member.

33. A seat riser according to claim 31 wherein:

(F) said pin and slot connection includes a slot in said frame structure and a pin on said hook.

34. A seat riser according to claim 24 wherein:

(E) said one striker is the rear striker.

* * * * *